April 21, 1942.                F. H. GAZIN                   2,280,406
                              LIGHT PROJECTOR
                        Filed Sept. 13, 1940         2 Sheets-Sheet 1
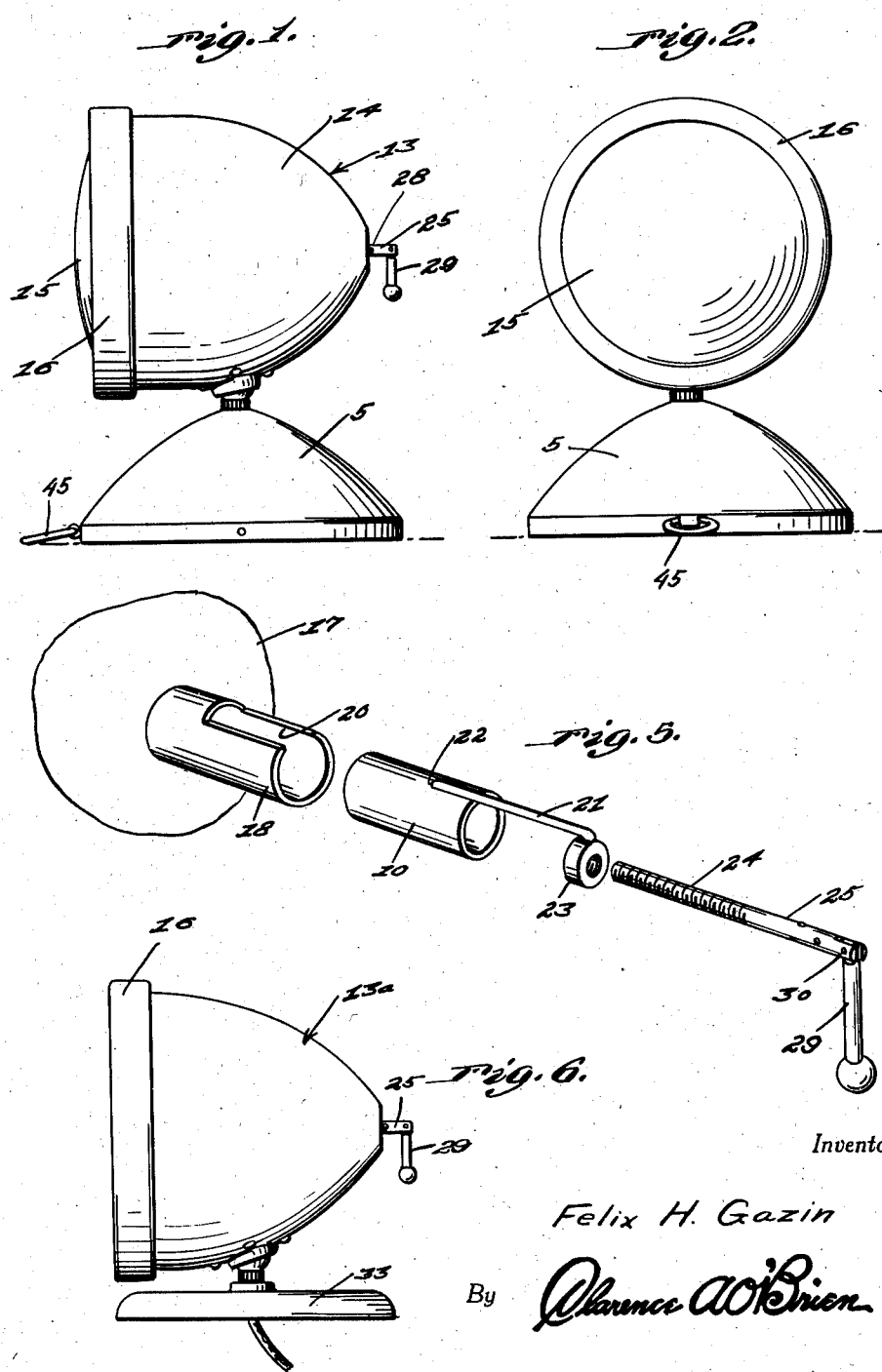
Inventor
Felix H. Gazin
By Clarence A. O'Brien
Attorney April 21, 1942.  F. H. GAZIN  2,280,406
LIGHT PROJECTOR
Filed Sept. 13, 1940  2 Sheets-Sheet 2
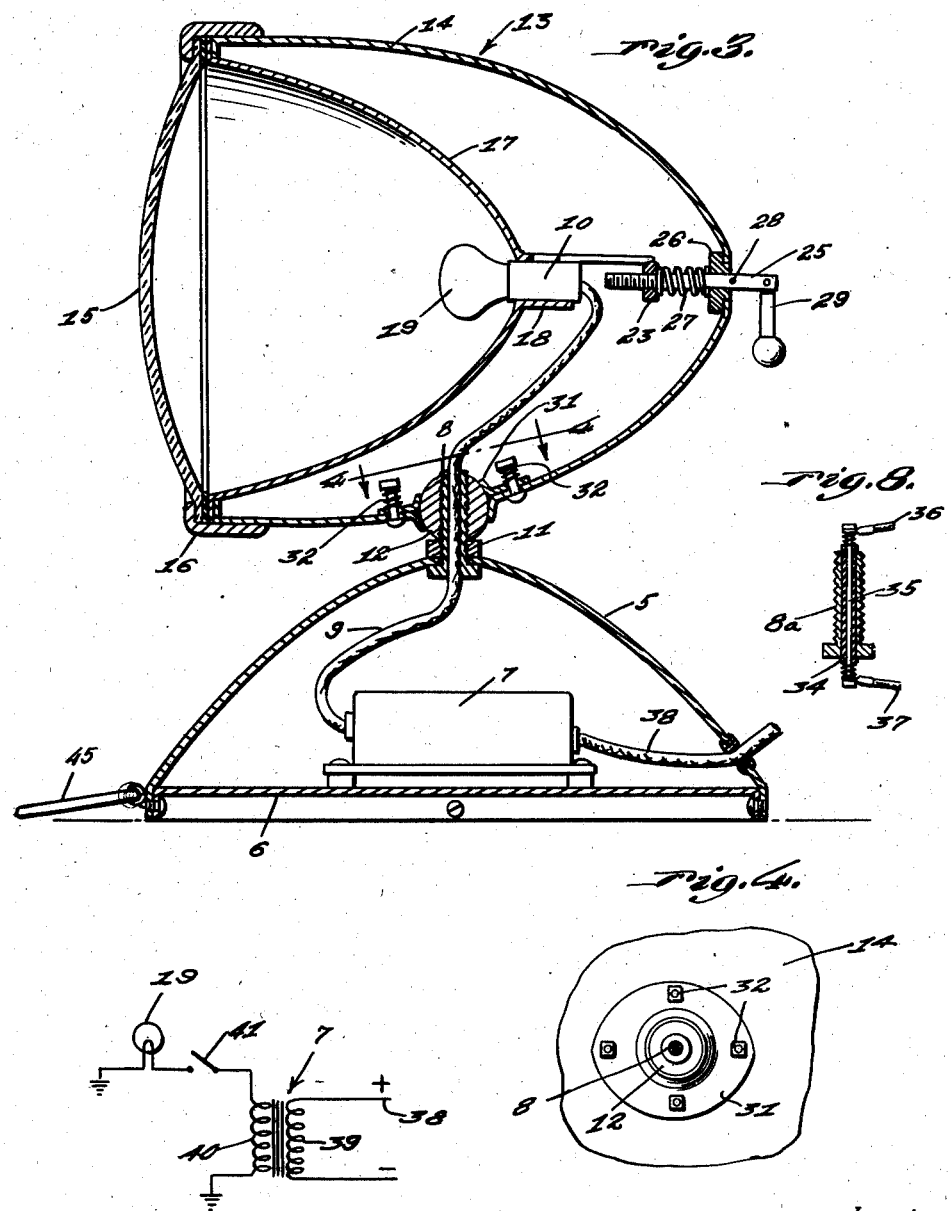
Inventor
Felix H. Gazin
By Clarence A. O'Brien
Attorney Patented Apr. 21, 1942

2,280,406

UNITED STATES PATENT OFFICE 2,280,406

LIGHT PROJECTOR

Felix H. Gazin, Rome, N. Y.

Application September 13, 1940, Serial No. 356,694

1 Claim. (Cl. 248—181)

This invention relates to new and useful improvements in the art of illumination and more particularly to an improved light projector.

The principal object of the present invention is to provide a portable light projector which can be conveniently carried from place to place as the need demands.

Another important object of the invention is to provide a light projector wherein the beam can be adjusted as circumstances require.

Still another important object of the invention is to provide a light projector constructed in such a manner as to permit ready repair and replacement of parts.

A further object of the invention is to provide a light projector which can be operated on a minimum current consumption.

These and various other important objects and advantages of the invention will become apparent to the reader of the following specification.

In the drawings:

Figure 1 represents a side elevational view of the projector.

Figure 2 is a front elevational view.

Figure 3 is an enlarged vertical sectional view through the light projector.

Figure 4 is a fragmentary detailed sectional view taken substantially on a line 4—4 of Figure 3.

Figure 5 is a fragmentary perspective exploded view showing the adjusting means for the bulb socket.

Figure 6 is a side elevational view of a slightly modified form of the invention.

Figure 7 is a diagrammatic view showing the electrical connections between the electrical devices involved.

Figure 8 is a longitudinal section through the connecting means for the light projector and base shown in Figure 6.

Referring to the drawings, wherein like numerals designate like parts, it can be seen that numeral 5 denotes a hollow base having the removable bottom 6 upon which is secured a step-down transformer. This transformer is preferably wired to step down the usual 110 volt commercial supply to approximately 20 to 25 volts.

The top of the base 5 has an opening therein for receiving a tubular bolt 8 through which the conductor 9 from transformer 7 extends to a lamp socket 10.

It can be seen that the bolt 8 is provided with a jamb nut 11 for holding the bolt 8 in upright position above the base 5 as substantially shown in Figure 3, and to the end that a diametrically bored and threaded ball 12 can be disposed thereon as in the manner substantially shown in Figure 3.

Numeral 13 generally refers to the light projector which consists of a shell 14 having its forward end open but traversed by a lens 15 held in place with respect to the shell 14 by a rim 16. This rim 16 also holds in place a reflector 17 and this reflector 17 is formed to provide a tubular guide 18 for the bulb socket 10, this socket 10 having a bulb 19 disposed therein.

As shown in Figure 5 the socket guide 18 has a slot 20 in the top thereof to accommodate a rod 21 which is welded or otherwise secured to the socket 10 as at 22. The rear end of the rod 21 has a depending nut 23 secured thereto and rotatable in this nut 23 is the threaded end portion 24 of a shaft 25 which is journalled through a bearing 26 mounted in the rear portion of the shell 14. A compression spring 27 is located on this shaft 25 between the bearing 26 and the nut 23. A cross pin 28 prevents longitudinal movement of the shaft 26 into the shell 14.

The outer end of the shaft 25 is bifurcated and has one end of a handle 29 pivotally secured therein as at 30.

Obviously, the handle 29 will serve as a means for rotating the shaft 25 so as to adjust the socket 10 inwardly or outwardly with respect to the reflector 17 and thus vary the beam projected by the reflector.

Figure 3 discloses that the lower portion of the shell 14 has an opening therein with the shell at this edge portion flared downwardly to follow the curvature of the ball 12 and an annulus 31 is mounted on the inside of the shell to cooperate with the downwardly disposed edge portion of the shell to define a socket for the ball 12. Resilient means 32 is provided for the annulus 31.

A modification of the invention is shown in Figures 6 and 8. In this form of the invention a flat base 33 is employed in conjunction with the light projector 13a.

A threaded bolt 8a is disposed from the base 33 into the light projector 13a and this tubular bolt 8a has a tube 34 of insulation disposed longitudinally therethrough, and through this tube of insulation is disposed a post 35 of current conductive material. A conductor 36 extends from one end of the post 35 to the lamp socket in the projector 13a while a conductor 37 extends from the other end of the post to the secondary of the transformer 7.

Numeral 38 denotes the current supply to the transformer 7. Of the transformer 7 numeral 39 denotes the primary, while numeral 40 denotes the secondary. These coils are wound so as to reduce the current from approximately 110 volts to around 23 volts. A suitable switch 41 may be employed between the secondary and the lamp 19.

On the lower portion of the hollow base 5 is located a swingably mounted ring 45 which can be used to hang the light projector from a wall or other vertical structure. Furthermore, any type of bulb, such as a double-contact bulb, may be used in the projector in conjunction with suitable switch means either on the base 5 or shell 14.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is—

A light projector comprising a hollow base, a projector shell for mounting on said base, said projector shell provided with a socket in the bottom portion thereof, a ball above said base movably disposed in the socket and having a diametrical bore therethrough, a tubular member extending from the base to define a conductor conduit, said tubular member extending through the bore of the ball and being clamped to said base, said socket being in a pair of sections, one of said sections being yieldably mounted and adapted to exert pressure against the ball, the other section forming an integral part of the shell.

FELIX H. GAZIN.